United States Patent
Mueh et al.

(10) Patent No.: US 9,908,781 B2
(45) Date of Patent: Mar. 6, 2018

(54) PROCESS AND USE OF AMINO-FUNCTIONAL RESINS FOR DISMUTATING HALOSILANES AND FOR REMOVING EXTRANEOUS METALS

(75) Inventors: Ekkehard Mueh, Rheinfelden (DE); Hartwig Rauleder, Rheinfelden (DE); Jaroslaw Monkiewicz, Rheinfelden (DE); Reinhold Schork, Rheinfelden (DE)

(73) Assignee: Evonik Degussa GmbH, Essen (DE)

( * ) Notice: Subject to any disclaimer, the term of this patent is extended or adjusted under 35 U.S.C. 154(b) by 282 days.

(21) Appl. No.: 13/383,681

(22) PCT Filed: May 18, 2010

(86) PCT No.: PCT/EP2010/056771
§ 371 (c)(1),
(2), (4) Date: Mar. 30, 2012

(87) PCT Pub. No.: WO2011/006697
PCT Pub. Date: Jan. 20, 2011

(65) Prior Publication Data
US 2012/0183464 A1    Jul. 19, 2012

(30) Foreign Application Priority Data

Jul. 15, 2009 (DE) .................. 10 2009 027 730

(51) Int. Cl.
C01B 33/107    (2006.01)

(52) U.S. Cl.
CPC ...... C01B 33/107 (2013.01); C01B 33/10773 (2013.01); C01B 33/10784 (2013.01); *C01P 2006/80* (2013.01)

(58) Field of Classification Search
None
See application file for complete search history.

(56) References Cited

U.S. PATENT DOCUMENTS

| | | | | |
|---|---|---|---|---|
| 3,968,199 A * | 7/1976 | Bakay | ..................... | 423/347 |
| 4,113,845 A | 9/1978 | Litteral | | |
| 4,676,967 A | 6/1987 | Breneman | | |
| 6,905,576 B1 * | 6/2005 | Block | .................. | C01B 33/043 |
| | | | | 202/154 |
| 8,002,954 B2 | 8/2011 | Popp et al. | | |
| 8,038,961 B2 | 10/2011 | Sonnenschein et al. | | |
| 8,105,564 B2 | 1/2012 | Sonnenschein et al. | | |
| 2004/0022713 A1 | 2/2004 | Bulan et al. | | |
| 2004/0028594 A1* | 2/2004 | Klein et al. | ................. | 423/342 |
| 2004/0030171 A1* | 2/2004 | Klein et al. | ................. | 556/452 |
| 2008/0197014 A1 | 8/2008 | Lang et al. | | |
| 2010/0080746 A1 | 4/2010 | Lang et al. | | |
| 2010/0266489 A1 | 10/2010 | Rauleder et al. | | |
| 2010/0270296 A1 | 10/2010 | Rauleder et al. | | |
| 2010/0274028 A1 | 10/2010 | Mueh et al. | | |
| 2010/0278706 A1 | 11/2010 | Mueh et al. | | |
| 2010/0296994 A1 | 11/2010 | Rauleder et al. | | |
| 2010/0320072 A1 | 12/2010 | Schwarz et al. | | |
| 2011/0052474 A1 | 3/2011 | Mueh et al. | | |
| 2011/0150739 A1 | 6/2011 | Seliger et al. | | |
| 2011/0184205 A1 | 7/2011 | Rauleder et al. | | |
| 2012/0195804 A1 | 8/2012 | Lang et al. | | |
| 2012/0214005 A1 | 8/2012 | Wieber et al. | | |

FOREIGN PATENT DOCUMENTS

| | | |
|---|---|---|
| DE | 100 57 462 | 5/2002 |
| DE | 10 2007 050 199 | 4/2009 |
| WO | 2006 013129 | 2/2006 |
| WO | 2006 029930 | 3/2006 |
| WO | 2007 025787 | 3/2007 |
| WO | 2008 113619 | 9/2008 |
| WO | 2009 049943 | 4/2009 |

(Continued)

OTHER PUBLICATIONS

Sigma-Aldrich USA website catalog, Styrene-divinylbenzene Copolymer (Aug. 2014).*
Li, K.Y., et al., Redistribution Reaction of Trichlorosilane in a Fixed-Bed Reactor, Ind. Eng. Chem. Res. (Apr. 1988), 27, 1600-1606.*
DOWEX Ion Exchange Resins, Tech Facts, Procedure for Brine Cleaning of Anion Resins, Dow (Aug. 2002).*
International Search Report dated Nov. 18, 2010 in PCT/EP10/56771 filed May 18, 2010.
U.S. Appl. No. 13/580,843, filed Aug. 23, 2012, Mueh, et al.
U.S. Appl. No. 13/884,473, filed Jul. 23, 2013, Mueh, et al.
U.S. Appl. No. 14/111,643, filed Oct. 14, 2013, Mueh, et al.
U.S. Appl. No. 13/985,477, filed Aug. 14, 2013, Mueh, et al.
U.S. Appl. No. 13/447,703, filed Apr. 16, 2012, US2012/0195804 A1, Lang, et al.

(Continued)

*Primary Examiner* — Melissa S Swain
(74) *Attorney, Agent, or Firm* — Oblon, McClelland, Maier & Neustadt, L.L.P.

(57) ABSTRACT

The invention relates to a process for dismutating at least one halosilane and reducing the content of extraneous metal and/or a compound containing extraneous metal in the at least one halosilane and in the at least one silane obtained, by contacting at least one halosilane of the general formula I, $H_nSiCl_m$ (I), where n and m are integers and n=1, 2 or 3 and m=1, 2 or 3 and n+m=4, with a particulate, organic, amino-functional resin to obtain at least one silane of the general formula II, $H_aSiCl_b$ (II), where a and b are integers and a=0, 2, 3 or 4 and b=0, 1, 2 or 4 where a+b=4, in one step, in which the content of extraneous metal and/or compounds containing extraneous metal has been reduced compared to the halosilane of the formula I. The invention further provides for the use of this resin for dismutating halosilanes and as an absorbent of extraneous metals or compounds containing extraneous metal in a process for preparing monosilane.

12 Claims, No Drawings

(56) References Cited

FOREIGN PATENT DOCUMENTS

| WO | 2009 049944 | 4/2009 |
|---|---|---|
| WO | 2009 071358 | 6/2009 |
| WO | 2009 069951 | 7/2009 |
| WO | 2009 089950 | 9/2009 |
| WO | 2009 153090 | 12/2009 |
| WO | 2010 066487 | 6/2010 |
| WO | 2011 000695 | 1/2011 |
| WO | 2011 103941 | 9/2011 |

OTHER PUBLICATIONS

U.S. Appl. No. 12/524,371, filed Jul. 24, 2009, US2010/0080746 A1, Lang, et al.
U.S. Appl. No. 12/738,799, filed Jul. 13, 2010, US2010/0270296 A1, Rauleder, et al.
U.S. Appl. No. 13/504,331, filed Apr. 26, 2012, US2012/0214005 A1, Wieber, et al.
U.S. Appl. No. 13/884, 326, filed May 9, 2013, Mueh, et al.
U.S. Appl. No. 12/065,126, filed Feb. 28, 2008, US2008/0197014 A1, Lang, et al.
U.S. Appl. No. 12/738,246, filed Jun. 9, 2010, US2010/0266489 A1, Rauleder, et al.
U.S. Appl. No. 12/681,114, filed Apr. 1, 2010, US2010/0274028 A1, Mueh, et al.
U.S. Appl. No. 12/811,925, filed Jul. 7, 2010, US2010/0278706 A1, Mueh, et al.
U.S. Appl. No. 12/528,087, filed Aug. 21, 2009, US2010/0320072 A1, Schwarz, et al.
U.S. Appl. No. 12/744,204, filed May 21, 2010, US2010/0296994 A1, Rauleder, et al.
U.S. Appl. No. 12/999,240, filed Mar. 4, 2011, US2011/0150739 A1, Seliger, et al.
U.S. Appl. No. 12/812,857, filed Jul. 14, 2010, US2011/0052474 A1, Mueh, et al.
U.S. Appl. No. 13/121,702, filed Mar. 30, 2011, US2011/0184205 A1, Rauleder, et al.
U.S. Appl. No. 13/383,965, filed Jan. 13, 2012, Rauleder, et al.

* cited by examiner

PROCESS AND USE OF AMINO-FUNCTIONAL RESINS FOR DISMUTATING HALOSILANES AND FOR REMOVING EXTRANEOUS METALS

The invention relates to a process for dismutating at least one halosilane while simultaneously reducing the content of extraneous metal and/or a compound containing extraneous metal in one process step in the at least one halosilane and in the at least one silane obtained, by contacting at least one halosilane of the general formula I, $H_nSiCl_m$ (I), where n and m are integers and n=1, 2 or 3 and m=1, 2 or 3 and n+m=4, with a particulate, organic, amino-functional resin to obtain at least one silane of the general formula II, $H_aSiCl_b$ (II), where a and b are integers and a=0, 2, 3 or 4 and b=0, 1, 2 or 4 where a+b=4, in one step, and the content of extraneous metal and/or compounds containing extraneous metal in the silane has been reduced compared to the halosilane of the formula I. The invention further provides for the use of this resin for dismutating halosilanes and as an absorbent of extraneous metals or compounds containing extraneous metal in a process for preparing monosilane.

In the semiconductor and solar industries, silicon compounds, Si—H-containing silicon compounds such as dichlorosilane or silane/monosilane, are required in high and ultrahigh purity. Silicon compounds used in microelectronics, for example to produce high-purity silicon by means of epitaxy, or silicon nitride (SiN), silicon oxide (SiO), silicon oxynitride (SiON), silicon oxycarbide (SiOC) or silicon carbide (SiC), also have to meet particularly high demands on the purity thereof. This is especially true in the production of thin layers of these materials. In chip production, contamination of the silicon compounds with metallic impurities leads to undesired doping of the epitaxial layers, for example epitaxial silicon layers.

For example, one use of silicon tetrachloride ($SiCl_4$) is to produce light waveguides. For these applications, $SiCl_4$ is required in very high purity. More particularly, metallic and/or metal-based impurities are a crucial disadvantage, even if they are present only in the region of the detection limit or in amounts of a few μg/kg (=ppb). Metallic impurities in halosilanes have an adverse effect on the damping behaviour of light waveguides, by increasing the damping values and hence reducing signal transmission.

In addition, high-purity $HSiCl_3$ for preparation of monosilane or monosilane for thermal decomposition to ultrapure silicon is an important feedstock in the production of solar or semiconductor silicon. In general, high-purity halosilanes are sought-after starting compounds in the fields of electronics, the semiconductor industry and in the pharmaceutical industry.

Hydrogen-containing chlorosilanes or monosilane are prepared by dismutating higher chlorosilanes in the presence of a dismutation catalyst for more rapid establishment of chemical equilibrium. For instance, monosilane ($SiH_4$), monochlorosilane ($ClSiH_3$) and also dichlorosilane (DCS, $H_2SiCl_2$) are prepared from trichlorosilane (TCS, $HSiCl_3$) with formation of the silicon tetrachloride (STC, $SiCl_4$) coproduct. Corresponding processes and amine-functionalized inorganically supported and organopolysiloxane dismutation catalysts are disclosed by DE 3711444 C2 and DE 3925357 C1.

As a result of the preparation process of, for example, tetrachlorosilane or trichlorosilane from silicon, the impurities present in the silicon are usually likewise chlorinated, and some of them are entrained into the downstream synthesis steps. Especially the chlorinated metallic impurities have an adverse effect in the production of components in the electronics sector, especially the dissolved compounds which are difficult to remove. A virtually complete removal of the metals and semimetals, which are counted with the metal, before or after the subsequent dismutation is inconvenient and costly.

The removal of boron-containing impurities from silicon compounds with $CH_3CN$ to form complexes of higher-boiling boron adducts is disclosed by U.S. Pat. No. 2,812,235. The removal of the adducts requires a further costly process step, generally a column distillation such as a rectification. Alternatively, the removal can also be effected by adsorption on adsorbents, which subsequently have to be removed mechanically, for example by means of filtration, or by distillation. Known adsorbents are activated carbons, silicas, for example fumed silicas, or silicates, such as montmorillonites, and zeolites, for example Wessalith F20, and organic resins, such as Amberlite XAD4.

DE 28 52 598 discloses a complex three-stage purification process using first cationic resins, and then anionic resins, and activated carbon in the third step.

It was an object of the present invention to develop an economically viable and simpler process which affords the hydrogen-containing silanes or chlorosilanes in high purity. It was a further object to make the application of the process more efficient.

The objects are achieved according to the information in the claims; preferred embodiments are described in the dependent claims and in detail in the description.

It has been found that, surprisingly, by contacting at least one halosilane of the formula I used with a particulate, especially purely organic, amino-functional resin, preferably a dialkylamino- or dialkylaminomethylene-functionalized or trialkylammonium- or trialkylammoniummethylene-functionalized divinylbenzene-styrene copolymer, at least one silane of the general formula II and/or else a halosilane of the formula II is obtained, in which the content of extraneous metal and/or compound containing extraneous metal has been reduced significantly compared to the halosilane of the formula I used. It has thus been found that, surprisingly, a dialkylamino- or dialkylaminomethylene-functionalized or trialkylammonium- or trialkylammoniom-ethylene-functionalized divinylbenzene-styrene copolymer can be used both as a dismutation catalyst and simultaneously as an adsorbent in a single process step, in order to obtain purified silanes of the formula II from halosilanes of the formula I used, especially from trichlorosilane-containing halosilanes. Preferred purified dismutation products are dichlorosilane and more preferably monosilane. The amino-functionalized resin used acts as an adsorbent and catalyst. According to the invention, it is used in the process or the method of use in essentially anhydrous form and free of organic solvents.

The invention therefore provides a process for dismutating at least one halosilane; and optionally a halosilane-containing mixture; with simultaneous reduction of the content of extraneous metal and/or of a compound containing extraneous metal in the at least one halosilane to obtain at least one silane, by contacting at least one halosilane of the general formula I $$H_nSiCl_m \quad \text{(I)}$$

where n and m are each integers and n=1, 2 or 3 and m=1, 2 or 3, with the proviso that n+m=4, preferably n=1 and m=3

(trichlorosilane); the halosilane preferably being metered and/or refluxed continuously or discontinuously into the process;

with a particulate, organic; especially purely organic; amino-functional resin to obtain at least one silane of the general formula II, preferably two silanes or a mixture containing at least one silane of the formula II,

where a and b are each integers and a=0, 2, 3 or 4 and b=0, 1, 2 or 4 with a+b=4, preferably where x=0, 2 or 4 and y=4, 2 or 0; and the halosilane of the formula I is especially different from the silane of the formula II, in which the content of extraneous metal and/or compounds containing extraneous metal has been reduced compared to the halosilane of the formula I. According to the invention, the halosilane is dismutated and the purified silane, the halosilane or a mixture containing them is obtained in a single process step, especially during a reactive distillation or reactive rectification for preparing monosilane (a=4) and/or dichlorosilane (a=2, b=2) from trichlorosilane (n=1, m=3) and substreams containing trichlorosilane.

The invention thus provides a process for dismutating a halosilane of the formula I to obtain a silane of the formula I, where the silane of the formula I is different from the halosilane of the formula II used, and is especially dismutated with the contacting with the resin and is simultaneously reduced by a content of extraneous metal and/or compound containing extraneous metal.

The process is preferably performed in such a way that trichlorosilane is supplied either batchwise or continuously to the process and is simultaneously contacted with the resin in a trichlorosilane-containing substream. The trichlorosilane-containing substream may arise from reactive distillation or reactive rectification.

Reactive distillation is characterized by combination of reaction and distillative separation in one apparatus, especially a column and optionally in a side reactor assigned to the column. The constant distillative removal of the particular lowest-boiling compound in each spatial element always maintains an optimal gradient between equilibrium state and actual content of lower-boiling compound, such as monosilane, so as to result in a maximum reaction rate.

The anhydrous and solvent-free resin is particularly suitable for dismutating and purifying the halosilane of the formula I, such that, after the distillative removal of the silane of the formula II, especially of the monosilane, no further purification steps, such as contacting with activated carbon, are necessary. The silane of the formula I obtained can be decomposed directly and thermally to ultrapure silicon, which is preferably used in the solar and electronics industry. Equally, the silicon tetrachloride thus obtained can be used directly to prepare $SiO_2$ for production of light waveguides.

For the process according to the invention and also the inventive use, it is absolutely essential that the resin is essentially anhydrous and free of organic solvents. The resin, such as Amberlyst® A21 or A26OH, is preferably introduced already in anhydrous and solvent-free form into the process and optionally into the apparatus for performing the process under protective gas atmosphere, such as under nitrogen, argon. To date, this has been considered to be impossible on the industrial scale. Therefore, in the prior art, the catalyst or an adsorbent is first washed with organic solvents in the plant in which it is employed or is transferred into the plant in organic solvents and then freed from the organic solvents. It is also possible with preference to use a mixture of the resin with other adsorbents or dismutation catalysts in order to achieve an optimal reduction in the content of extraneous metals, such as iron, aluminium and also semimetals, such as boron.

By definition, a resin is considered to be essentially anhydrous and free of organic solvents when the water or organic solvent content, in each case in relation to the total weight of the resin, is less than 2.5% by weight to, for example, 0.0001% by weight, especially less than 1.5% by weight, preferably less than 1.0% by weight, preferentially less than 0.5% by weight, more preferably 0.3% by weight, better less than 0.1 or ideally less than 0.01% by weight down to the detection limit, for example to 0.0001% by weight.

It is particularly advantageous that the extraneous metal content and/or the content of the compound containing extraneous metal—generally a residual content of extraneous metal or compound containing extraneous metal which is difficult to remove or cannot be removed any further by distillation—can especially be reduced independently, in each case to a content in the region of less than 100 µg/kg, especially less than 75 µg/kg, preferably less than 25 µg/kg, more preferably less than 15 µg/kg, especially preferably less than 10 µg/kg. The degree of reduction of the extraneous metal content is also determined by the ratio of resin to halosilane and/or silane and the contact time. The person skilled in the art is aware of how the optimal treatment conditions should be determined.

The purely organic, amino-functional resin used in accordance with the invention is outstandingly suitable for dismutation and simultaneously for adsorptive removal of extraneous metal-containing compounds which are difficult to remove by distillation and dissolve or are completely dissolved in the halosilanes and/or the silanes of the formula II formed. The adsorptive removal of the extraneous metal-containing compounds probably results from complex formation of the extraneous metal-containing compound and the resin. Extraneous metals present in particulate form are subsequently, if anything, retained mechanically by the packed resin in particulate form.

The extraneous metals or the compounds containing extraneous metal can generally be determined by quantitative analysis methods, as known per se to those skilled in the art, for example by means of atomic absorption spectroscopy (AAS) or photometry, especially by inductively coupled plasma mass spectrometry (ICP-MS) and inductively coupled plasma optical emission spectroscopy (ICP-OES)—to mention just a few options. The adsorbent is essentially anhydrous and solvent-free. Karl Fischer methods (DIN 51 777) can be used to determine the water content in the adsorbent, and the solvent content is detectable, for example, by means of TGA-MS, TGA-IR or other analytical methods known to the person skilled in the art. Solvents are considered to be alcohols such as methanol, ethanol, or acetone, and aromatic solvents such as toluene.

Extraneous metals and/or compounds containing extraneous metal are considered to be those in which the metal or semimetal is not silicon. The at least one extraneous metal and/or compound containing extraneous metal is especially adsorbed selectively from the halosilanes and/or silanes; the adsorption can be affected either in solution or in the gas phase. Extraneous metals or compounds containing extraneous metal are also understood to mean semimetals or compounds containing semimetals, for example boron and boron trichloride.

More particularly, the extraneous metals and/or compounds containing extraneous metal whose levels are to be reduced are metal halides, metal hydrohalides and/or metal hydrides, and mixtures of these compounds. Metal halides can be removed with very good results. Examples thereof may be aluminium trichloride or else iron(III) chloride, and also entrained particulate metals which may originate from continuous processes.

It is possible with preference to reduce the contents of boron, aluminium, potassium, lithium, sodium, magnesium, calcium and/or iron; it is possible with particular preference to significantly reduce the content of boron and iron in the halosilane and/or silane; more particularly, compounds based on these metals are removed. As explained above, the compounds are frequently present dissolved in the composition and are difficult to remove by distillation, for example $BCl_3$.

The process according to the invention and the inventive use are suitable particularly for the removal or reduction of the level of extraneous metal-containing compounds whose boiling point is in the region of the boiling point of a silane of the formula II or would be distilled over as an azeotrope therewith. Some of these extraneous metal-containing compounds can be removed by distillation only with difficulty, if at all. A boiling point which is in the region of the boiling point of a silane is considered to be a boiling point which is in the range of ±20° C. of the boiling point of one of the silanes of the formula II at standard pressure (about 1013.25 hPa or 1013.25 mbar).

The compounds to be adsorbed are generally present completely dissolved in the halosilane, silane or the mixture containing them and can be removed by distillation only with difficulty.

In general, the level of the extraneous metal and/or of the compound containing extraneous metal can be reduced by 50 to 99% by weight. The extraneous metal content is preferably reduced by 70 to 90% by weight, more preferably by 70 to 99% by weight, especially preferably by 85 to 99% by weight. For iron-containing halosilanes, silanes or mixtures containing them, the process enables a reduction in the residual content by 70% by weight, preferably 95 to 99% by weight. In general, it is possible, for example, to reduce the iron content by 50 to 99% by weight, preferably 70 to 99% by weight, and the boron content by at least 90% by weight, preferably by 95 to 99.5% by weight, especially in one process step, preferably directly in the course of the disproportionation step.

The extraneous metal content and/or the content of the compound containing extraneous metal in the halosilane, silane or mixture containing them can preferably, in relation to the metallic compound, especially independently of one another, each be reduced to a content in the range from less than 100 µg/kg down to the detection limit, especially of less than 25 µg/kg, preferably less than 15 µg/kg, more preferably 0.1 to 10 µg/kg down to the particular detection limit.

To perform the process, the purely organic amino-functional resins used are more preferably amino-functionalized, aromatic polymers with alkyl-functionalized secondary, tertiary and/or quaternary amino groups. The alkyl groups may be linear, branched or cyclic, preference being given to methyl or ethyl. According to the invention, amino-functionalized divinylbenzene-styrene copolymers can be used, i.e. divinylbenzene-crosslinked polystyrene resin, particular preference being given to those from the group of the dialkylamino-functionalized or dialkylaminomethylene-functionalized divinylbenzene-styrene copolymers or trialkylammonium-functionalized or trialkylammoniomethylene-functionalized divinylbenzene-styrene copolymers, especially where alkyl is methyl or ethyl, preference being given to the aforementioned species di- or trimethyl-substituted in each case.

In addition to the dimethylamino-functionalized, divinylbenzene-crosslinked, porous polystyrene resins, it is also possible to use further divinylbenzene-crosslinked, porous polystyrene resins functionalized with quaternary and additionally optionally tertiary amino groups in the process according to the invention or for the inventive use in the process. All the resins feature a high specific surface area, porosity and high chemical stability.

The following formulae illustrate, in idealized form, the structure of the aforementioned functionalized divinylbenzene-styrene copolymers:

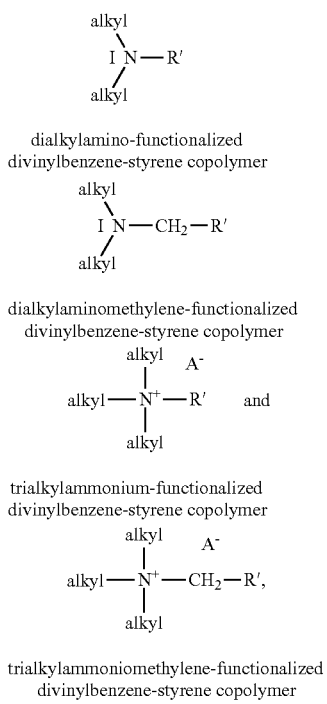

where R' is a polymeric support, especially divinylbenzene-crosslinked polystyrene, i.e. divinylbenzene-styrene copolymer, alkyl is independently preferably methyl, ethyl, n-propyl, i-propyl, n-butyl or i-butyl, and $A^-$ is independently an anion—for example but not exclusively from the group of $OH^-$ (hydroxyl), $Cl^-$ (chloride), $CH_3COO^-$ (acetate) or $HCOO^-$ (formate), especially $OH^-$.

A particularly suitable dismutation catalyst and simultaneously adsorbent for the process according to the invention or the use is found to be divinylbenzene-crosslinked polystyrene resin with tertiary amino groups, such as Amberlyst® A21, an ion exchange resin based on divinylbenzene-crosslinked polystyrene resin with dimethylamino groups on the polymeric backbone of the resin. Amberlyst® A21 is a weakly basic anion exchange resin which can be purchased in the form of the free base and in spheres with a mean diameter of about 0.49 to 0.69 mm and a water content of up to 54 to 60% by weight in relation to the total weight. The surface area is about 25 $m^2/g$ and the mean pore diameter 400 angström.

Amberlyst® A 26 OH, which is based on a quaternary trimethylamino-functionalized divinylbenzene-styrene copolymer and has a highly porous structure, can likewise be used in the process according to the invention and for the inventive use. The mean particle diameter of the resin is typically 0.5 to 0.7 mm. The resin is sold as the ionic form (known as the hydroxide form, "OH"). The water content may be 66 to 75% by weight in relation to the total weight. The surface area is about 30 m$^2$/g with a mean pore diameter of 290 angström.

The invention also provides a process in which a purely organic, especially essentially anhydrous and solvent-free, amino-functional resin for dismutating at least one halosilane and for reducing the content of extraneous metal and/or a compound containing extraneous metal therein, and the dismutation products, i.e. of the formula I and/or II,
  (i) are contacted with trichlorosilane, of the formula I, to obtain a silane of the formula II, such as monosilane, monochlorosilane, dichlorosilane and tetrachlorosilane or a mixture containing at least two of the compounds mentioned, or
  (ii) is contacted with dichlorosilane, of the formula I, to obtain a silane of the formula II, such as monosilane, monochlorosilane, trichlorosilane and silicon tetrachloride or a mixture of at least two of the compounds mentioned, and, after the contacting in (i) or (ii), the content of extraneous metal or compound containing extraneous metal has been reduced.

A particular advantage of the process according to the invention is that the content of impurities in the more highly chlorinated halosilanes, such as tetrachlorosilane, is not increased as in the prior art processes. In the process according to the invention, it is possible to obtain pure monosilane, dichlorosilane, monochlorosilane or tetrachlorosilane, optionally after distillative separation. Subsequent or preceding steps for removing extraneous metals or compounds containing extraneous metal or organic impurities, with the exception of any phosphorus-containing compounds, can be dispensed with.

In a further aspect of the invention, a particulate, organic, amino-functional resin, preferably as defined above, is used to dismutate at least one halosilane of the general formula I and to essentially simultaneously reduce the content of at least one extraneous metal and/or of at least one compound containing extraneous metal in the halosilane and in the at least one silane of the formula II obtained, or mixtures comprising them, the formulae I and II being as defined above.

Preference is given to the use for dismutating a halosilane or mixtures comprising halosilanes, and to the use, especially simultaneously, for reducing the content of at least one extraneous metal and/or of at least one compound containing extraneous metal in at least one halosilane, silane or mixtures comprising halosilanes by the above-described process, more preferably according to any one of claims 1 to 8. According to the invention, the resin is used in essentially anhydrous form and free of organic solvents.

In general, the process according to the invention or the inventive use of amino-functional resins for dismutation and adsorption in one process step is carried out by first washing the resin, optionally 1) with high-purity, deionized water, and 2) then preparing the water-containing resin in anhydrous form, without further treatment, applying reduced pressure or vacuum and optionally regulating the temperature, especially at a temperature below 200° C.; in a step 3), the vacuum is optionally broken by means of inert gas or dried air; and the anhydrous and solvent-free catalyst is obtained after step 2) or 3). In the subsequent step, the catalyst thus prepared can be contacted with the halosilane of the formula I to perform the process according to the invention, especially according to any one of claims 1 to 10.

The resin is preferably treated under reduced pressure at elevated temperature, more preferably below 150° C. In one alternative, the process for treating the resin can also be performed without step 1). The amino-functional resin is preferably treated in the temperature range from −196° C. to 200° C., especially from 15° C. to 175° C., preferably from 15° C. to 150° C., more preferably from 20° C. to 135° C., most preferably from 20° C. to 110° C., the temperature range from 20° C. to 95° C. being particularly preferred here. The treatment is typically performed after the establishment of the temperature in the temperature range from 60° C. to 140° C., especially from 60° C. to 95° C., preferably under reduced pressure and optionally with agitation of the particulate resin.

It is preferred when the treatment of the amino-functional resin is effected under reduced pressure from 0.0001 mbar to 1012 mbar (mbar absolute). More particularly, the reduced pressure is at values in the range from 0.005 mbar to 800 mbar, preferably in the range from 0.01 mbar to 600 mbar, more preferably in the range from 0.05 to 400 mbar, further preferably in the range from 0.05 mbar to 200 mbar, more advantageously in the range from 0.05 mbar to 100 mbar, especially in the range from 0.1 mbar to 80 mbar, better in the range from 0.1 mbar to 50 mbar, even better in the range from 0.001 to 5 mbar; the pressure is even more preferably less than 1 mbar. Preference is given to establishing a reduced pressure or vacuum in the range from 50 mbar to 200 mbar, preferably from down to less than 1 mbar to 50 mbar, at elevated temperature, especially at 15° C. to 180° C., more preferably in the range from 20° C. to 150° C. Preference is given to treatment at less than 100° C. and a pressure in the range from 0.001 to 100 mbar, preferably in the range from 0.001 to 70 mbar. The range of variation in the determinable water content may be plus/minus 0.3% by weight.

The aforementioned treatment of the amino-functional resin containing up to 40 to 70% by weight of water in the temperature range from 80° C. to 140° C. under a reduced pressure of 50 mbar to 200 mbar down to less than 1 mbar has been found to be particularly advantageous for establishing a water content of less than 2% by weight, preferably of less than 0.8% by weight down to less than 0.5% by weight, while simultaneously retaining the structure. In addition, drying under these conditions can be effected on the industrial scale within an acceptable process duration. It is possible to entirely dispense with the use of organic solvents in order to be able to use the resin as a dismutation catalyst and as an adsorbent to prepare high-purity silanes of the formula I and/or high-purity tetrachlorosilane. It should be particularly emphasized that the resin, by virtue of the drying under reduced pressure, maintains and preserves its inner porous structure and its outer form, and hence its activity as an adsorbent and simultaneously dismutation catalyst. The water content of the amino-functional resin thus treated is preferably less than 2.5% by weight, more preferably in the range from 0.00001 to 2% by weight.

The water content can be determined, for example, according to Karl-Fischer (Karl-Fischer titration, DIN 51 777). The water contents of the amino-functional resin which can be established after the inventive treatment are appropriately in the range from 0, i.e. undetectable by KF, to 2.5% by weight, especially in the range from 0.0001% by weight to 2% by weight, preferably in the range from 0.001 to 1.8% by weight, more preferably in the range from 0.001 to 1.0% by weight, further preferably in the range from 0.001 to 0.8% by weight, better in the range from 0.001 to 0.5% by weight, 0.001 to 0.4% by weight or 0.001 to 0.3% by weight. At the same time, the treatment of the resin mentioned allows the structure of the dismutation catalyst and adsorbent to be retained, avoiding use of organic solvents.

The aforementioned method for treating the resin ensures that, in the reactive/distillative reaction region with a catalyst bed, an essentially anhydrous, solvent-free and simultaneously high-purity resin, which is free of impurities, can be used. The resin itself thus does not lead to any additional introduction of impurities which would have to be removed, for example, with a bottom product from a reactive/distillative system.

For dismutation of the at least one halosilane of the formula I and for reduction in the content of extraneous metal or compounds containing extraneous metal, the resin, treated as described above in order to prevent hydrolysis of the silanes to be purified, is contacted under protective gas atmosphere with the halosilanes, optionally while stirring. The contacting is suitably effected at room temperature and standard pressure over several hours. The halosilane is typically contacted with the resin for in the range from 1 minute up to 10 hours, generally up to 5 hours. The dismutated and purified silanes and/or halosilanes are obtained or removed generally by distillation. Alternatively, it is preferred to perform the process in a reactive/distillative manner, as described above.

The invention likewise provides for the use of a resin treated by the process mentioned for dismutating chlorosilanes and for adsorption, especially for simultaneous adsorption, of extraneous metals and compounds comprising them, especially for preparing dichlorosilane, monochlorosilane or monosilane from more highly substituted chlorosilanes, which are purer than the reactants. The treated resin can preferably be used to dismutate (i) trichlorosilane to obtain monosilane, monochlorosilane, dichlorosilane and tetrachlorosilane or a mixture containing at least two of the compounds mentioned or (ii) dichlorosilane can be used to obtain monosilane, monochlorosilane, trichlorosilane and silicon tetrachloride or a mixture of at least two of the compounds mentioned.

The process according to the invention is more preferably integrated into a multistage overall process for preparing ultrapure silicon, which comprises the following steps: 1) preparing trichlorosilane, 2) disproportionating and adsorbing extraneous metals or compounds containing extraneous metals, 3) distilling to obtain ultrapure silane of the formula II and 4) thermally decomposing the silane (monosilane) to give ultrapure silicon. Ultrapure silane is understood to mean a silane which is suitable for preparing ultrapure silicon for use as solar silicon or semiconductor silicon.

The invention is illustrated in detail by the examples which follow without restricting it to these examples.

EXAMPLE 1.1

Pretreatment of the resin or of the pure adsorbents. The adsorbents are carefully dried before use in the process in order to prevent hydrolysis of the halosilanes to be purified.

EXAMPLE 1.2

General process method for treating the halosilane contaminated with extraneous metals and/or metallic compounds.

A defined amount of amino-functionalized resin or adsorbent is initially charged in a 500 ml stirred apparatus comprising a glass four-neck flask with condenser (water, dry ice), dropping funnel, stirrer, thermometer and nitrogen connection, and, under reduced pressure (<1 mbar), a) the amino-functionalized resin and Amberlite™ XAD 4 are dried at 95° C. and b) the further adsorbents are each dried at 170° C. over 5 hours, followed by slow venting with dry nitrogen and cooling.

Subsequently, 250 ml of the halosilane are added via the dropping funnel. Over a period of 5 hours, the adsorption operation is performed under standard pressure at room temperature under a protective gas atmosphere. The adsorbent is removed from the silane by drawing it through a frit (por. 4) into an evacuated 500 ml glass flask with discharge device. Subsequently, the glass flask is vented with nitrogen and discharged into a nitrogen-purged Schott glass bottle.

EXAMPLE 1.3—COMPARATIVE EXAMPLE

The example which follows was performed according to the general process method with the amounts specified here.

36.0 g of Amberlite™ XAD 4 were pretreated according to the general method described under Example 1.2, and 250 ml of trichlorosilane were added. The metal contents before and after the treatment were determined by means of ICP-MS. The trichlorosilane content was determined by gas chromatography (area percent).

TABLE 1.3

Extraneous metal contents before and after the treatment:

| Metal | Content before treatment | Content after treatment |
| --- | --- | --- |
| Boron | 1100 µg/kg | 13 µg/kg |
| Iron | 130 µg/kg | 7.9 µg/kg |
| GC: | | |
| Trichlorosilane | 99.9% | 99.9% |

EXAMPLE 1.4—COMPARATIVE EXAMPLE

The example which follows was performed according to the general process method with the amounts specified here.

36.9 g of K 10 montmorillonite were pretreated according to the general method described under Example 1.2, and 250 ml of trichlorosilane were added. The metal contents before and after the treatment were determined by means of ICP-MS. The trichlorosilane content was determined by gas chromatography (area percent).

TABLE 1.4

Extraneous metal contents before and after the treatment:

| Metal | Content before treatment | Content after treatment |
| --- | --- | --- |
| Aluminium | 18 µg/kg | <0.9 µg/kg |
| Boron | 1100 µg/kg | 54 µg/kg |
| Iron | 3.1 µg/kg | 1.3 µg/kg |
| GC: | | |
| Trichlorosilane | 99.9% | 99.9% |

EXAMPLE 1.5—COMPARATIVE EXAMPLE

The example which follows was performed according to the general process method with the amounts specified here.

20.0 g of Wessalith F 20 were pretreated according to the general method described under Example 1.2, and 250 ml of trichlorosilane were added. The metal contents before and after the treatment were determined by means of ICP-MS. The trichlorosilane content was determined by gas chromatography (area percent).

TABLE 1.5

Extraneous metal contents before and after the treatment:

| Metal | Content before treatment | Content after treatment |
|---|---|---|
| Aluminium | 130 µg/kg | 66 µg/kg |
| Boron | 1100 µg/kg | <10 µg/kg |
| Iron | 130 µg/kg | 4.0 µg/kg |
| GC: | | |
| Trichlorosilane | 99.9% | 99.9% |

EXAMPLE 1.6—INVENTIVE

The example which follows was performed according to the general process method with the amounts specified here.

14.2 g of Amberlyst® A21 (dry mass) were pretreated according to the general method described under Example 1.2, and 250 ml of trichlorosilane were added. The metal contents before and after the treatment were determined by means of ICP-MS. The composition was determined by gas chromatography (area percent).

TABLE 1.6

Extraneous metal contents before and after the treatment, and composition:

| Metal | Content before treatment | Content after treatment |
|---|---|---|
| Boron | 840 µg/kg | 72 µg/kg |
| Iron | 31 µg/kg | 8 µg/kg |
| GC: | | |
| Trichlorosilane | 99.9% | 91.7% |
| Silicon tetrachloride | — | 5.5% |
| Dichlorosilane | — | 2.8% |
| Monochlorosilane | — | <0.1% |

* Monochlorosilane was detectable in traces. Owing to the low boiling points, the monochlorosilane and monosilane reaction products could not be retained quantitatively in the reaction mixture.

EXAMPLE 1.7—INVENTIVE

The example which follows was performed according to the general process method with the amounts specified here.

80.2 g of Amberlyst® A21 (dry mass 28.9 g) were pretreated according to the general method described under Example 1.2, and 250 ml of trichlorosilane were added. The composition was determined by gas chromatography (area percent).

TABLE 1.7

| | Composition | |
|---|---|---|
| GC | Content before treatment | Content after treatment |
| Trichlorosilane | 99.9% | 87.8% |
| Silicon tetrachloride | — | 8.4% |
| Dichlorosilane | — | 3.6% |
| Monochlorosilane* | — | <0.1% |

*Monochlorosilane was detectable in traces. Owing to the low boiling points, the monochlorosilane and monosilane reaction products could not be retained quantitatively in the reaction mixture.

The invention claimed is:

1. A process for dismutating a trichlorosilane, the process comprising:
   first washing a particulate, organic, amino-functional resin with deionized water, the resin comprising a dialkylamino- or dialkylaminomethylene-functionalized divinylbenzene-styrene copolymer or trialkylammonium- or trialkylammoniummethylene-functionalized divinylbenzene-styrene copolymer, to obtain a water-containing resin;
   then applying reduced pressure or vacuum to the water-containing resin and regulating the temperature at below 200° C., and then removing the reduced pressure or vacuum, thereby obtaining an anhydrous and solvent-free catalyst resin having a water content of less than 2% by weight, without contacting the resin with an organic solvent after washing with the deionized water; and
   conducting a reactive distillation or reactive rectification of a trichlorosilane-containing stream with the anhydrous and solvent-free catalyst resin, to obtain at least two silanes, thereby reducing a content of a compound comprising boron, iron, or both to less than 10 µg/kg,
   wherein:
   the at least two silanes are represented by formula (II):

$$H_aSiCl_b \qquad (II);$$

a and b are integers;
   a=0, 2, 3 or 4;
   b=0, 1, 2 or 4;
   a+b=4;
   the catalyst resin, then contacted with the trichlorosilane, has a water content, if present, of less than 2% by weight and an organic solvent content, if present, of 2.5% by weight or less;
   the content of the compound comprising boron, iron, or both is reduced by from 70 to 99% by weight; and
   the reactive distillation or reactive rectification comprises reaction and distillative separation in one apparatus.

2. The process of claim 1, wherein a silane of the at least two silanes comprises a monosilane which is distilled with the catalyst resin after the conducting and is decomposed thermally to ultrapure silicon.

3. The process of claim 1, wherein contacting the trichlorosilane with the catalyst resin reduces a content of iron.

4. The process of claim 1, wherein contacting the trichlorosilane with the catalyst resin reduces a content of boron.

5. The process of claim 1, wherein the content of the compound comprising boron, iron, or both is reduced by from 95 to 99% by weight.

6. The process of claim 1, wherein the catalyst resin, when contacted with the trichlorosilane, has an organic solvent content, if present, of 0.5% by weight or less.

7. The process of claim 1, wherein the process does not comprise contacting either of the at least two silanes with activated carbon.

8. The process of claim 2, wherein the process does not comprise any further purification step after the monosilane is distilled.

9. The process of claim 1, wherein the catalyst resin has a water content of less than 0.8% by weight.

10. The process of claim 1, wherein contacting trichlorosilane with the catalyst resin comprises supplying trichlorosilane is supplied batchwise to the catalyst resin.

11. The process of claim 1, wherein the apparatus comprises a column.

12. The process of claim 11, wherein the apparatus further comprises a side reactor assigned to the column.

\* \* \* \* \*